United States Patent [19]

Lambert et al.

[11] 3,932,304

[45] Jan. 13, 1976

[54] METHOD FOR FORMING A CATALYTIC DEPOSIT

[75] Inventors: Claude Lambert, St-Michel-sur-Orge; Pierre Bono, Morangis; Bernadette Pichon, Velizy; Jacques Daunay, Versailles, all of France

[73] Assignee: Societe Generale de Constructions Electriques et Mecaniques Alsthom & Cie, Paris, France

[22] Filed: Apr. 4, 1974

[21] Appl. No.: 457,843

[30] Foreign Application Priority Data
Apr. 16, 1973  France .............................. 73.13728

[52] U.S. Cl. .............. 252/428; 136/122; 136/86 D; 252/410; 252/444; 252/511; 427/122
[51] Int. Cl.².B01J 21/18; H01M 4/08; H01M 4/96; H01B 1/04
[58] Field of Search ........... 252/410, 426, 428, 444, 252/511; 136/122, 121, 120 FC; 117/226; 427/122

[56] References Cited
UNITED STATES PATENTS

| | | | |
|---|---|---|---|
| 2,664,453 | 12/1953 | Lang ..................................... | 136/121 |
| 3,111,495 | 11/1963 | Murphy et al. ....................... | 117/226 |
| 3,488,225 | 1/1970 | Selker et al. ................... | 136/120 FC |
| 3,840,407 | 10/1974 | Yao et al. ....................... | 136/120 FC |

*Primary Examiner*—Patrick P. Garvin
*Assistant Examiner*—P. E. Konopka
*Attorney, Agent, or Firm*—Flynn & Frishauf

[57] ABSTRACT

A method for producing a catalytic carbon deposit on a conductive support comprising admixing (i) a suspension of between 200 and 400 grams per liter of catalytic carbon in a liquid medium, with (ii) a solution of between 20 and 50 grams per liter of polyvinyl chloride in a cyclic ketone solvent, to form an emulsion, depositing said emulsion on said support, and evaporating the liquid components of said emulsion from said support to form a layer of catalytic carbon in a polyvinyl chloride binder.

6 Claims, No Drawings

METHOD FOR FORMING A CATALYTIC DEPOSIT

The present invention has for its object a method for producing a catalytic deposit.

It is a known practice to form the deposit of a catalyst on a support by putting the said catalyst and a binding agent such as polytetrafluorethylene, polypropylene or others in suspension in a suitable liquid, by depositing by any suitable means such a suspension on the support and by effecting a drying possibly followed by a sintering according to the nature of the binding agent used.

Nevertheless, it is observed that the binding agent coats the grains of catalyst and sets up chemical connections, this causing a certain inhibition of the catalyst and a poor efficiency of the chemical reaction which takes place on its contact.

The present invention makes it possible to overcome these disadvantages and it has for its object a method enabling the producing of a catalytic deposit by limiting to the greatest possible extent the coating of the catalyst by the binding agent so that the catalytic zones may be reached by the reagents, which, in this way, react with maximum efficiency.

The invention concerns therefore a method for producing a catalytic deposit on a support by the simultaneous depositing of a catalyst and of a binding agent, that method being characterized in that it comprises the following stages:

On the one hand, a suspension of the said catalyst is formed in a first liquid medium;

On the other hand, a solution of the said binding agent in a second medium which cannot be mixed with the said first medium is formed in a second liquid medium;

The said suspension is mixed with the said solution;

The emulsion thus obtained is deposited on the said support:

The said liquid mediums are removed from the deposit by evaporation.

In the foregoing method, the catalyst is carbon in suspension in said liquid medium in a proportion of between 200 and 400 grams per liter. The solution is a solution of polyvinyl chloride in a cyclic ketone in a proportion of between 20 and 50 grams per liter.

An example of embodiment of a catalytic deposit of activated carbon on a support with a view to constituting an anode of a fuel cell will be described hereinbelow purely by way of an illustration having no limiting character.

On the one hand, a suspension comprising 1,6 g of activated carbon in 5 cc of a mixture of water and triethanolamine is formed, the latter substance being used in a proportion of 1 percent of the whole mixture.

It is also possible to use, instead of water, an alcohol and, more particularly, butyl alcohol.

Furthermore, a polyvinyl chloride (PVC) solution in cyclohexanone in a proportion of 40 grammes of PVC per litre is prepared. The suspension and the solution are mixed so as to obtain an emulsion which is then projected by means of a pneumatic gun onto a plate made, for example of stainless steel or of conductive plastic. Thus, a catalytic deposit which is dried in a ventilated oven is formed.

It will be observed that at the time of mixing of the activated carbon suspension with the PVC solution, the water or the butyl alcohol, previously fixed by the carbon, precipitate the PVC dissolved in cyclohexanone, which becomes fixed at the surface of the grains of carbon in a multi-phase substance limiting to the greatest extent the coating of the catalytic zones. An active anode affording the greatest accessibility to the electrolyte and to the reagents and enabling the chemical reaction to take place with maximum efficiency, is thus produced. In order to give a clear idea, approximately 85 percent of the original surface of the catalyst takes part effectively in the reaction.

Such a method therefore enables the producing of active electrodes with small quantities of catalyst.

Moreover, the characteristics of such an electrode remain practically unchanged in time.

A particular case of embodiment of an anode for a methanol/air cell has been described in the preceding text. It is nevertheless to be understood that different deposits of catalysts and binding agents may be formed by implementing a similar method forasmuch going beyond the scope of the invention.

More particularly, besides the branch of fuel cells, the invention may be implemented in numerous catalytic chemical processes.

The invention is therefore in no way limited to the embodiment described, which has been given only by way of an example.

More particularly, without going beyond the scope of the invention, details may be modified, certain compositions may be changed or certain products may be replaced by equivalent products.

What is claimed is:

1. A method for producing a catalytic carbon deposit on a conductive support comprising
    admixing (i) a suspension of between 200 and 400 grams per liter of catalytic carbon in a liquid medium from the group consisting of water and alcohol, with (ii) a solution of between 20 and 50 grams per liter of polyvinyl chloride in a cyclic ketone solvent, to form an emulsion,
    depositing said emulsion on said support, and
    evaporating the liquid components of said emulsion from said support to form a layer of catalytic carbon in a polyvinyl chloride binder.

2. The method of claim 1 wherein said liquid medium is water which additionally contains triethanol amine in a proportion of 1 percent of said mixture.

3. The method of claim 1 wherein said liquid medium is butyl alcohol.

4. The method of claim 3 wherein said cyclic ketone is cyclohexanone.

5. The method of claim 2 wherein said cyclic ketone is cyclohexanone.

6. The method of claim 1 wherein said cyclic ketone is cyclohexanone.

* * * * *